(12) United States Patent
Yun

(10) Patent No.: US 11,847,787 B2
(45) Date of Patent: Dec. 19, 2023

(54) METHOD AND APPARATUS FOR IMAGE REGISTRATION

(71) Applicant: HYUNDAI MOBIS CO., LTD., Seoul (KR)

(72) Inventor: Yeo Min Yun, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/525,822

(22) Filed: Nov. 12, 2021

(65) Prior Publication Data

US 2023/0038125 A1    Feb. 9, 2023

(30) Foreign Application Priority Data

Aug. 5, 2021 (KR) .................. 10-2021-0102897

(51) Int. Cl.
*G06T 7/33* (2017.01)
*G06T 17/00* (2006.01)
*G06T 19/20* (2011.01)

(52) U.S. Cl.
CPC ............ *G06T 7/344* (2017.01); *G06T 17/00* (2013.01); *G06T 19/20* (2013.01); *G06T 2207/30252* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 9,866,752 B2 * | 1/2018 | Zhang .................... B60R 1/00 |
| 11,393,114 B1 * | 7/2022 | Ebrahimi Afrouzi ... G06T 7/174 |
| 2003/0189980 A1 | 10/2003 | Dvir et al. |

(Continued)

FOREIGN PATENT DOCUMENTS

| CN | 111462172 | 7/2020 |
| JP | 2005-520361 | 7/2005 |

(Continued)

OTHER PUBLICATIONS

Korean Office Action issued in KR 10-2021-0102897 dated Aug. 13, 2022.

(Continued)

*Primary Examiner* — Kee M Tung
*Assistant Examiner* — Jed-Justin Imperial
(74) *Attorney, Agent, or Firm* — DLA Piper LLP (US)

(57) ABSTRACT

An image registration apparatus including at least one processor and configured to project, to a first model, a first image generated based on an image obtained from a first camera to generate a first intermediate image, to map the first intermediate image to a first output model to generate a first output image, to project, to a second model, a second image generated based on an image obtained from a second camera to generate a second intermediate image, to map the second intermediate image to a second output model to generate a second output image, and to determine a match rate between the first output image and the second output image and transform at least one of the first model and the second model based on a determined match rate and a preset reference match rate.

16 Claims, 10 Drawing Sheets

(56) References Cited

U.S. PATENT DOCUMENTS

| | | | |
|---|---|---|---|
| 2014/0301648 A1* | 10/2014 | Kato | G06F 18/28 |
| | | | 382/199 |
| 2015/0178884 A1 | 6/2015 | Scholl et al. | |
| 2016/0044240 A1 | 2/2016 | Beers | |
| 2017/0046833 A1* | 2/2017 | Lurie | G06T 7/579 |
| 2020/0020072 A1 | 1/2020 | Ely | |

FOREIGN PATENT DOCUMENTS

| | | |
|---|---|---|
| KR | 2016-0072190 | 6/2016 |
| KR | 10-1915729 | 11/2018 |
| WO | WO 2014/142669 | 9/2014 |

OTHER PUBLICATIONS

English Language Abstract of JP 2005-520361 published Jul. 7, 2005.
English Language Abstract of KR 2016-0072190 published Jun. 22, 2016.
Extended European Search Report dated Jun. 6, 2022 issued in 21215606.1.
English Language Abstract of KR 10-1915729 published Nov. 6, 2018.
English Language Abstract of CN 111462172 published Jul. 28, 2020.

* cited by examiner

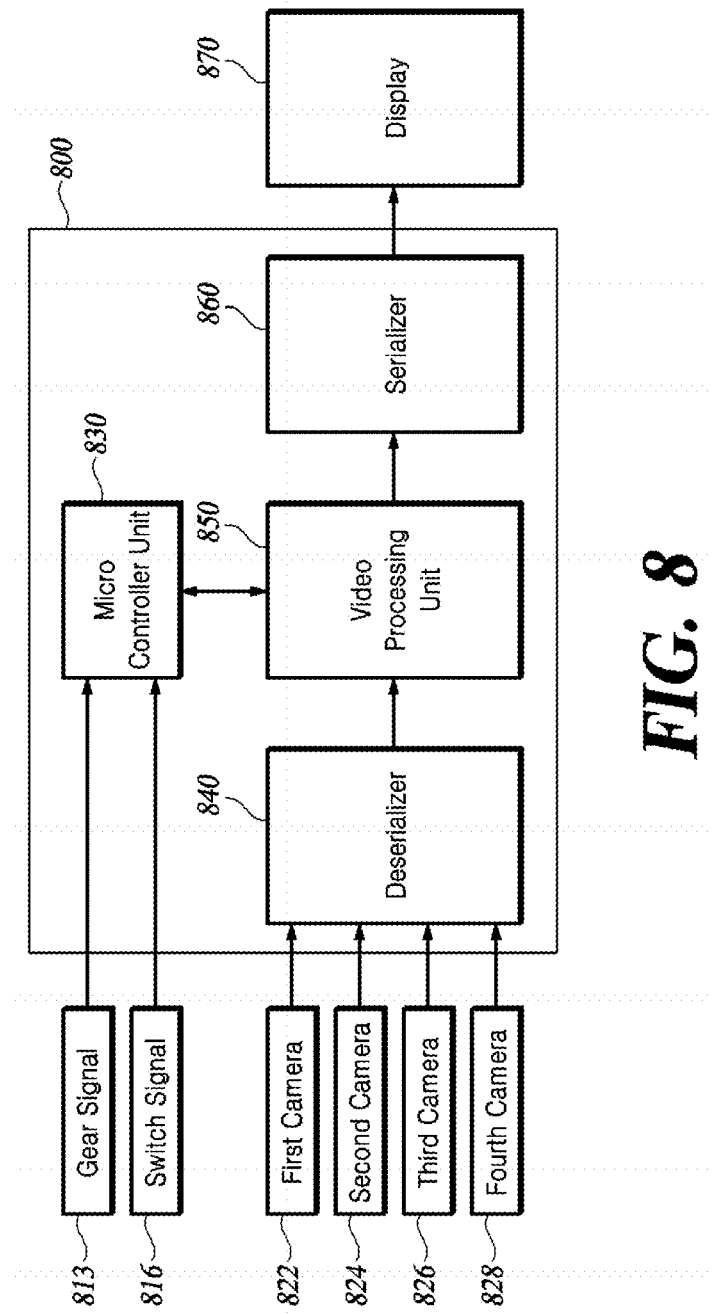

METHOD AND APPARATUS FOR IMAGE REGISTRATION

CROSS-REFERENCE TO RELATED APPLICATIONS

This application is based on, and claims priority from, Korean Patent Application Number 10-2021-0102897, filed Aug. 5, 2021, the disclosure of which is incorporated by reference herein in its entirety.

TECHNICAL FIELD

The present disclosure in some embodiments relates to a method and apparatus for image registration.

BACKGROUND

The statements in this section merely provide background information related to the present disclosure and do not necessarily constitute prior art.

Vehicles are known to have a surround view monitoring (SVM) system as a function of imaging and displaying the surrounding environment of the vehicle for the driver to visually check the circumstances with ease.

The vehicle SVM system uses cameras installed in the front, rear, left and right sides of the vehicle, respectively, to capture images of the surrounding environment, and to register and provide the captured images in real-time to the in-vehicle output screen, in the form of a top view image as if the driver was looking at the vehicle from above. This can assist the driver with an accurate judgment of the surrounding situation of the vehicle by the surrounding image with the surrounding environment information displayed and enables the driver to conveniently park the vehicle without looking at the side mirror or the rearview mirror.

Newer vehicles employ a three-dimensional vehicle SVM system capable of displaying its surrounding situation in three dimensions.

To provide an image around a vehicle in three dimensions, multiple images captured by a plurality of cameras are mapped to a three-dimensional model and outputted. A three-dimensional image around the vehicle may be generated by combining multiple three-dimensional output images according to the positions, directions, and focal lengths of predetermined camera viewpoints.

A three-dimensional image obtained by combining multiple images needs those images to be combined with good registration established between neighboring images. However, since the respective images are at different angles and positions when they are captured by different cameras, a mismatch may occur in the boundary region of neighboring images. This mismatch aggravates a perceived discord in an image around the vehicle and reduces the discernability of the image, thereby hindering the vehicle driver from accurately recognizing the situation around the vehicle.

SUMMARY

According to at least one embodiment, the present disclosure provides an image registration apparatus including at least one processor and configured to project, to a first model, a first image generated based on an image obtained from a first camera to generate a first intermediate image, to map the first intermediate image to a first output model to generate a first output image, to project, to a second model, a second image generated based on an image obtained from a second camera to generate a second intermediate image, to map the second intermediate image to a second output model to generate a second output image, and to determine a match rate between the first output image and the second output image and transform at least one of the first model and the second model based on a determined match rate and a preset reference match rate.

According to at least one embodiment, the present disclosure provides an image registration method including the steps (not necessarily in the following order) of (i) projecting, to a first model, a first image generated based on an image obtained from a first camera to generate a first intermediate image, (ii) mapping the first intermediate image to a first output model to generate a first output image, (iii) projecting, to a second model, a second image generated based on an image obtained from a second camera to generate a second intermediate image, (iv) mapping the second intermediate image to a second output model to generate a second output image, and (v) determining a match rate between the first output image and the second output image and transforming at least one of the first model and the second model based on a determined match rate and a preset reference match rate.

BRIEF DESCRIPTION OF THE DRAWINGS

FIG. 8 is a diagram of the configuration of an image registration apparatus according to another embodiment of the present disclosure.

REFERENCE NUMERALS

Figure 1:
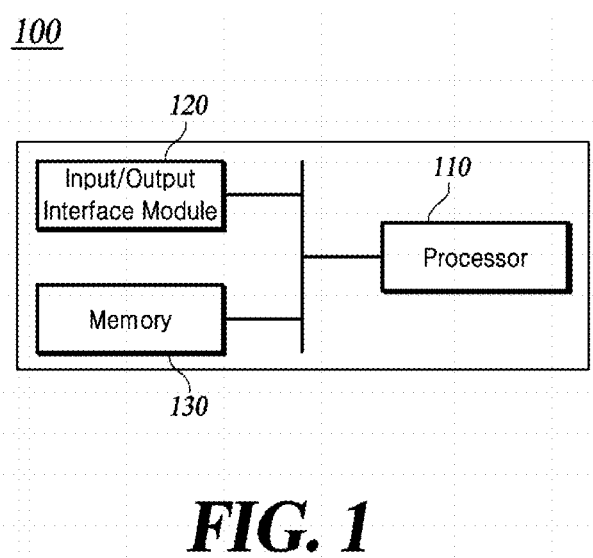
FIG. 1 is a diagram of a configuration of an image registration apparatus according to at least one embodiment of the present disclosure.

100: image registration apparatus 110: processor
120: input/output interface module 130: memory

DETAILED DESCRIPTION

According to some embodiments, the present disclosure seeks to provide an apparatus and method for video or image registration that remove a mismatch that occurs in a 3D video or image of combined images.

According to some embodiments, the present disclosure seeks to provide an apparatus and method for video or image registration that reduce a perceived discord in a 3D video or image between its component images and improve the discernability of the image.

The problems to be solved by the present disclosure are not limited to those mentioned above, and other unmentioned problems will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to a unit for processing at least one function or operation, which may be implemented by hardware, software, or a combination thereof.

The detailed description to be disclosed hereinafter together with the accompanying drawings is intended to describe illustrative embodiments of the present disclosure and is not intended to represent the only embodiments in which the present disclosure may be practiced.

FIG. 1 is a diagram of a configuration of an apparatus 100 for video or image registration according to at least one embodiment of the present disclosure.

As shown in FIG. 1, the image registration apparatus 100 according to at least one embodiment includes a processor 110, an input/output interface module 120, and a memory 130.

The processor 110, the input/output interface module 120, and the memory 130 may transmit data to each other in the image registration apparatus 100.

The input/output interface module 120 obtains a video or image captured by a first camera (not shown) therefrom and provides the image to the processor 110. The processor 110 processes the captured image from the first camera with an operation such as lens correction, rotation, horizontal translation, or vertical translation to generate a first image.

The processor 110 obtains a first intermediate image by projecting the first image onto a first model. Here, the initial form of the first model may be the same as that of a first output model. The first model may be transformed based on preset parameters, e.g., a first parameter, a second parameter, a third parameter, etc.

The first intermediate image includes first intermediate sub-images that are each obtained by projecting, onto the first model, images that correspond respectively to the frames constituting the first image. The first intermediate image may be a composite image in which the respective frames constituting the first image are combined with their respective corresponding first intermediate sub-images in chronological order.

The processor 110 obtains the first output image by mapping the first intermediate image to the first output model. Here, the mapping may be texture mapping. The first output model corresponds to all or a part of a preset 3D model. Here, the preset 3D model may have but is not limited to, any one of a hemisphere shape and a bowl shape.

The input/output interface module 120 obtains an image taken by the second camera and provides it to the processor 110. The processor 110 processes the captured image from the second camera with an operation such as lens correction, rotation, horizontal translation, or vertical translation to generate a second image.

The processor 110 projects the second image onto a second model to obtain a second intermediate image. Here, the initial form of the second model may be the same as that of a second output model. The second model may be transformed based on preset parameters.

The second intermediate image includes second intermediate sub-images that are each obtained by the processor 110 projecting, onto the second model, images that correspond respectively to the frames constituting the second image. The second intermediate image may be a composite image in which the respective frames constituting the second image are combined with their respective corresponding second intermediate sub-images in chronological order.

The processor 110 obtains the second output image by mapping the second intermediate image to the second output model. The second output image is an image obtained by the processor 110 texture mapping the second intermediate image to the second output model. The second output model corresponds to all or a part of the preset 3D model. Here, the preset 3D model may have but is not limited to, any one of a hemisphere shape and a bowl shape.

The first output image is arranged in the preset 3D model at a position corresponding to the first output model. The second output image is disposed in the preset 3D model at a position corresponding to the second output model. The first output model and the second output model may be arranged such that they are adjacent to each other with one side of the first output model forming a boundary line with one side of the second output model. Alternatively, the first output model and the second output model may be arranged such that they have some overlapping regions.

The processor 110 determines a degree of matching or match rate between the first output video or image and the second output video or image which are arranged in the three-dimensional model. The processor 110 may determine the match rate between the first output video and the second output videos by their frames corresponding to a preset period. Here, the preset period may be but is not limited to, ⅟30 second. The match rate between the first and second output images may be at least one of a degree of vertical match, a degree of curvature match, and a degree of proportion match.

The processor 110 obtains a first screen image, and it obtains, from the first screen image, a first comparison image that is two-dimensional. The first screen image is the first output image as appeared on a display that is included in the input/output interface module 120. The first comparison image may be a frame image corresponding to a preset time point of the first screen image. Here, the preset time point may be any one of a time point for determining the vertical match rate between the first and second output images, a time point for determining their curvature match rate, and a time point for determining their proportion match rate.

The processor 110 obtains a second screen image, and it obtains, from the second screen image, a second comparison image that is two-dimensional. The second screen image is the second output image as appeared on the display included in the input/output interface module 120. The second comparison image may be a frame image corresponding to a preset time point of the second screen image. Here, the preset time point may be any one of the time point of determining the vertical match rate between the first and second output images, the time point of determining the curvature match rate therebetween, and the time point of determining the proportion match rate therebetween.

According to at least one embodiment of the present disclosure, the processor 110 determines the match rate between the first and second output images based on a comparison of feature points between the first and second output images. The processor 110 sets a first region of interest (ROI, hereinafter, "region of interest") in the first comparison image, and sets a second region of interest in the second comparison image. Here, the first region of interest and the second region of interest may be set as regions in which the first comparison image and the second comparison image overlap.

The processor 110 extracts a first feature point from the first region of interest and a second feature point from the second region of interest by using a preset algorithm. Here, the preset algorithm may be a Scale Invariant Feature Transform (SIFT) algorithm, a Speeded Up Robust Feature (SURF) algorithm, a HARRIS Corners algorithm, a SUSAN algorithm, or the like.

The processor 110 compares the first feature point with the second feature point to determine the match rate between the first and second output images. Here, the first feature point and the second feature point may correspond to a common point of the first region of interest and the second region of interest. The match rate between the first and second output images may be determined based on a positional difference between the first feature point and the second feature point.

According to another embodiment, the processor 110 determines the match rate between the first and second output images based on a difference image between the first and second output images. The processor 110 sets a third region of interest in the first comparison image and sets a fourth region of interest in the second comparison image. Here, the third region of interest and the fourth region of interest may be set as overlapping regions between the first comparison image and the second comparison image.

The processor 110 obtains the difference image. The difference image is an image indicating a degree of mismatch between the third region of interest and the fourth region of interest. The processor 110 determines the match rate between the first and second output images based on the distribution of pixels included in the difference image. Here, the match rate between the first and second output images may be determined based on the number of pixels included in the difference image.

When the match rate between the first and second output images is equal to or greater than a preset reference match rate, the processor 110 determines that the first output image and the second output image are in registration and generates a first output image and a second output image based on the first model and the second model.

When the match rate between the first and second output images is less than the preset reference match rate, the processor 110 determines that at least one of the first output image and the second output image needs a correction. Thereafter, the processor 110 uses a preset parameter to change the vertical component value of the model coordinates of any one of the first model and the second model and thereby transforms at least one of the first model and the second model. Here, the model coordinates may be such model coordinates that express any one of the first model and the second model.

A direction in which the processor 110 projects any one of the first image and the second image onto any one of the first model and the second model may be set as a model's vertical direction. Here, the model's vertical direction may be the Z-axis direction of the Cartesian coordinate system in which any one of the first model and the second model is expressed.

When the vertical direction of the model is set to the Z-axis of the Cartesian coordinate system, the processor 110 may use the preset parameter to change the Z-axis component value of the model coordinates representing any one of the first model and the second model and thereby transform at least one of the first model and the second model. The processor 110 performs the model transformation by multiplying the Z-axis component values of the model coordinates representing any one of the first model and the second model by a C value, which is a preset parameter, respectively.

As shown in Equation 1, the processor 110 may transform any one of the first model and the second model by using the preset parameter of C value and use any one of the transformed first model and the second model to obtain a first intermediate image and a second intermediate image having new texture coordinates.

$$\begin{bmatrix} q'_x \\ q'_y \\ q'_z \end{bmatrix} = K \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \cdot C \\ 1 \end{bmatrix} \quad \text{Equation 1}$$

Here, X, Y, and Z are coordinate values of the Cartesian coordinate system, expressing the first model and the second model. 'q' denotes values relating to the new texture coordinates obtained based on any one of the transformed first model and the second model. 'r' denotes values related to image rotations in the process of generating the first image or the second image based on the image captured by the camera. 't' denotes values related to horizontal or vertical image movements in the process of generating the first image or the second image based on the image captured by the camera. K is a value related to the camera.

When multiplying by the C value, the value of the Z-axis component of the model coordinates representing any one of the first model and the second model changes. Any one of the first model and the second model becomes transformed based on the changed value of the Z-axis component. The processor 110 may obtain the first intermediate image or the second intermediate image having new texture coordinates by projecting any one of the first image and the second image onto any one of the transformed first model and the second model.

The processor 110 may transform any one of the first model and the second model in various ways by adjusting the C value so that the match rate between the first and second output images is equal to or greater than the preset reference match rate. Here, the match rate between the first and second output images may be at least one of a vertical match rate, a curvature match rate, and a proportion match rate.

The processor 110 transforms the model by adjusting the first parameter to impart new slopes to the side walls constituting any one of the first model and the second model. Here, the initial form of the first model may be the same as the first output model, and the initial form of the second model may be the same as the second output model. Additionally, the initial form of any one of the first model and the second model may be a hemispherical shape, a bowl shape, a part of a hemispherical shape, or a part of a bowl shape.

The processor 110 transforms the first model or the second model by adjusting the first parameter so that the vertical match rate between the first and second output images is equal to or greater than a preset reference vertical match rate. Here, the value of C, which is the first parameter, may be generated based on Equation 2.

$$c=\sin^{(C_{vertical})}\theta \quad \text{Equation 2}$$

Here, $C_{vertical}$ may have a value that is a real number between 0 and 1. $\theta$ may have a value between 0 and 90 degrees depending on the position in the model coordinates. However, possible values of each variable are not limited to these particulars.

The processor 110 transforms the model by adjusting the second parameter to impart a new curvature to the right or left portion of the side walls constituting any one of the first model and the second model. Here, the initial form of the first model may be the same as the first output model, and the initial form of the second model may be the same as the second output model. Additionally, the initial form of any one of the first model and the second model may be a hemispherical shape, a bowl shape, a part of a hemispherical shape, or a part of a bowl shape.

The processor 110 adjusts the second parameter so that the curvature match rate between the first output image and the second output image is equal to or greater than the preset reference curvature match rate to transform the first model or the second model. Here, the value of C, which is the second parameter, may be generated based on Equation 3.

$$c=\sin^{(C_{curvature})}\theta \quad \text{Equation 3}$$

Here, $\theta$ may have but is not limited to, a value between 0 degrees and 90 degrees depending on the position on the model coordinates. $C_{curvature}$ is a value generated based on Equation 4.

$$C{curvature}=1.0-(\cos\varphi\cdot\alpha) \quad \text{Equation 4}$$

Here, $\varphi$ is a value related to the angle between the cross section including the model coordinates to be transformed on the model and a left-right symmetry plane of the model. The $\varphi$ value may be used to transform the left or right part of the model independently. Using the left-right symmetry plane of the model as a reference (0 degrees), the left edge of the model is set to −90 degrees, and its right edge is set to 90 degrees. In this case, $\varphi$ may have a value between −90 degrees and 90 degrees. When transforming the left edge of the model, the $\varphi$ value becomes −90 degrees, and when transforming the right edge of the model, the $\varphi$ value becomes 90 degrees. $\alpha$ is the value that determines the degree to which a target portion is transformed in the model. The $\alpha$ value may have but is not limited to, a real value between 0 and 1.

The processor 110 transforms the model by adjusting the third parameter to render the vertical length of the model to increase or decrease at different ratios depending on the height of the side walls constituting any one of the first model and the second model. For example, any one model of the first model and the second model may be transformed so that the one model has the vertical length of its side walls incremented more and more from the lower end to the upper end thereof. Here, the initial form of the first model may be the same as the first output model, and the initial form of the second model may be the same as the second output model. Additionally, the initial form of any one of the first model and the second model may be a hemispherical shape, a bowl shape, a part of a hemispherical shape, or a part of a bowl shape.

The processor 110 adjusts the third parameter so that the proportion match rate between the first output image and the second output image is equal to or greater than the preset reference proportion match rate to transform the first model or the second model. Here, the value of C, which is the third parameter, may be generated based on Equation 5.

$$c=\sin^{(C_{weight})}\theta \quad \text{Equation 5}$$

Here, $\theta$ may have but is not limited to, a value between 0 degrees and 90 degrees depending on the position on the model coordinates. $C_{weight}$ is a value generated based on Equation 6.

$$C_{weight}=\cos^{\beta}\theta \quad \text{Equation 6}$$

Here, $\beta$ is a value related to the shape and proportion of model transformation. $\theta$ is a value related to the degree to which the model coordinates move away from the Z-axis. $\theta$ is an angle value formed with the Z-axis, and may have, but is not limited to, a value between 0 degrees and 90 degrees.

When the first model is transformed, the processor 110 projects the first image on the transformed first model to obtain a first intermediate image. The first intermediate image has new texture coordinates of the transformed first model. The processor 110 maps the first intermediate image to the first output model to obtain the first output image.

When the second model is transformed, the processor 110 projects the second image on the transformed second model to obtain a second intermediate image. The second intermediate image has new texture coordinates based on the transformed second model. The processor 110 maps the second intermediate image to the second output model to obtain a second output image.

The processor 110 may repeatedly adjust the preset parameter until the match rate between the first and second output images is equal to or greater than the preset reference match rate. Here, the match rate between the first and second output images may be any one of vertical match rate, curvature match rate, and proportion match rate. The preset parameter may be any one of the first parameter, the second parameter, and the third parameter.

In the above, the processor 110 has been described as generating the final screen image based on the first image and the second image. However, according to another embodiment, the processor 110 generates a final screen image based on the first to third images. According to yet another embodiment, the processor 110 generates a resultant screen image based on the first to fourth images.

The processor 110 has been described by the process of transforming the first model to vary its match rate with the second model, but the present disclosure, which is not limited to the above-described, may either transform the second model alone or transforms both the first model and the second model at the same time into models of different shapes, respectively.

The image registration apparatus 100 includes the input/output interface module 120. The input/output interface module 120 obtains image data from the first camera and the second camera and outputs the images generated by the processor 110. The input/output interface module 120 is connected to the first camera or the second camera through a wired/wireless communication network (not shown).

The input/output interface module 120 may be provided as integrated with the image registration apparatus 100. Alternatively, the input/output interface module 120 may be provided separately from the image registration apparatus 100 or may be provided as a separate device connected to the image registration apparatus 100. The input/output interface module 120 may include a port (e.g., a USB port) for connecting to an external device.

The input/output interface module 120 may include a monitor, a touch screen, a microphone, a keyboard, a camera, an image sensor, an earphone, a headphone, or a touchpad.

The image registration apparatus 100 includes a memory 130 capable of storing a program for processing or control of the processor 110 and various data for the operation of the image registration apparatus 100. The memory 130 may store at least one or more images generated by the processor 110, including the first image, second image, first intermediate image, second intermediate image, first output image, second output image, first screen image, second screen image, and the resultant screen images.

Figure 2:
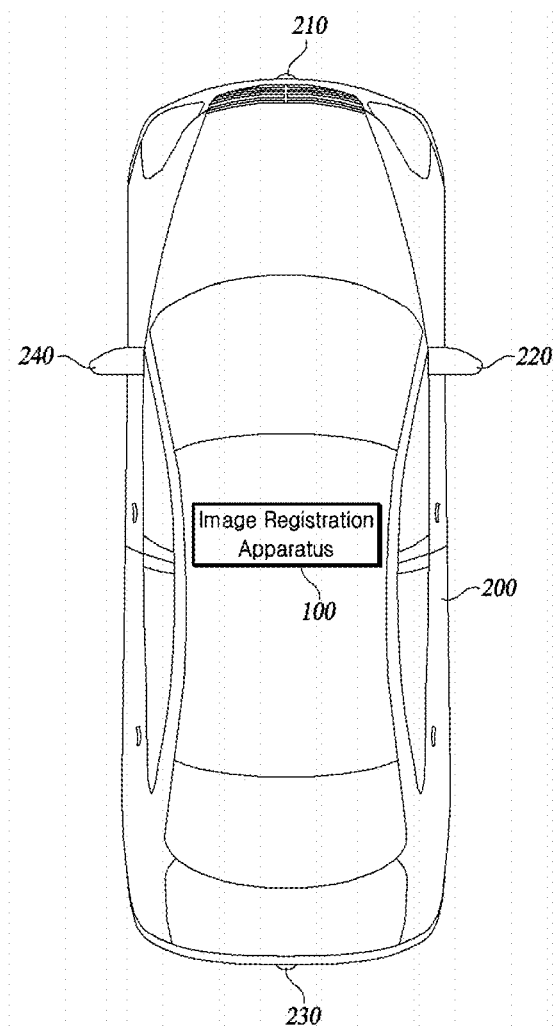
FIG. 2 is a diagram of an arrangement of cameras according to at least one embodiment of the present disclosure.

FIG. 2 is a diagram of an arrangement of cameras according to at least one embodiment of the present disclosure.

As shown in FIG. 2, at least one of cameras 210, 220, 230, 240 is connected to the image registration apparatus 100.

The cameras 210, 220, 230, 240 are disposed at preset positions of the vehicle 200, respectively. The arrangement of the cameras may be changed according to factors such as an imaging purpose, the number of cameras 210, 220, 230, 240, and the design of a vehicle 200 such as a length or contour thereof.

The cameras 210, 220, 230, 240 are disposed on the front, rear, left and right sides of the vehicle 200, and the like. Here, the front camera 210 may be disposed centrally of the radiator grill of the vehicle 200, and the right and left side cameras 220 and 240 may be disposed on the edges or bottoms of the side mirrors of the vehicle 200, respectively. Additionally, the rear camera 230 may be disposed in the center above the rear bumper.

Any two of the cameras 210, 220, 230, and 240 are arranged such that they have optical axes forming a preset angle. The preset angle may be, but is not limited to, 90 degrees.

The lenses of the cameras 210, 220, 230, and 240 may have a large angle of view, such as a wide-angle lens or a fisheye lens.

The cameras 210, 220, 230, 240 take images around the vehicle 200. At least two of the cameras 210, 220, 230, 240 may capture images around the vehicle 200 at the same time.

The cameras 210, 220, 230, 240 transmit the captured images to the image registration apparatus 100. For transmission, the cameras 210, 220, 230, and 240 may be equipped with a short-range wireless communication module such as a Wi-Fi module, a Bluetooth module, a Zigbee module, or a UWB module. The cameras 210, 220, 230, and 240 may be provided as integrated with the image registration apparatus 100, but they may be provided separately.

Figure 3A:
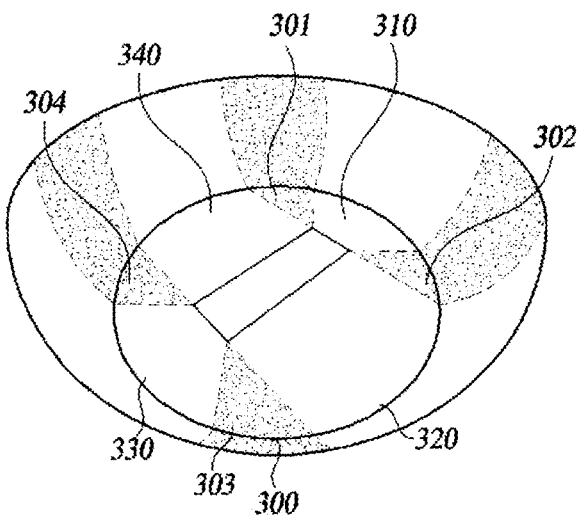
FIG. 3A and FIG. 3B are diagrams of an output model implemented by an image registration apparatus according to at least one embodiment of the present disclosure.
Figure 3B:
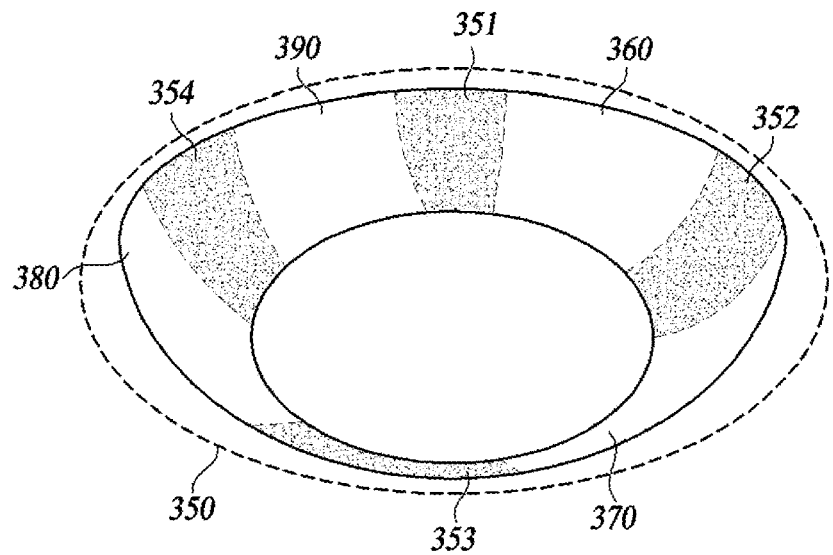

FIG. 3A and FIG. 3B are diagrams of an output model implemented by the image registration apparatus 100 according to at least one embodiment of the present disclosure.

FIG. 3A shows the bottom surface of a bowl model that is the output model implemented by the image registration apparatus 100. FIG. 3B shows side walls constituting the output bowl model implemented by the image registration apparatus 100.

The image registration apparatus 100 maps the first intermediate image to a first output model 310, the second intermediate image to a second output model 320, the third intermediate image to a third output model 330, and the fourth intermediate image to a fourth output model 340, respectively.

As shown in FIG. 3A, the image registration apparatus 100 combines a plurality of output models 310, 320, 330, and 340 to generate the bowl model as a composite output model.

The first output model 310, the second output model 320, the third output model 330, and the fourth output model 340 are arranged to be laterally adjacent to each other.

The first output model 310, the second output model 320, the third output model 330, and the fourth output model 340 are arranged to partially overlap.

The image registration apparatus may determine, as a bottom surface 300 of the bowl model, the surface area that has the zero slope in the bowl model surfaces and occupies some portions of the output models 310, 320, 330, and 340 of the bowl model.

The image registration apparatus may generate a bottom image visualizing the surrounding ground by using the images mapped respectively to the output models 310, 320, 330, and 340 disposed on the bottom surface 300 of the bowl model.

As shown in FIG. 3B, the image registration apparatus may determine, as side walls 350 of the bowl model, the surface areas with non-zero slopes, that is, non-bottom surfaces among the surfaces constituting the bowl model. Here, the side walls 350 of the bowl model may include the remainders of the first to fourth output models 310, 320, 330, 340 besides the zero-slope surface area of the bottom surface 300, that is, first output model sides 360, second output model sides 370, third output model sides 380, and fourth output model sides 390. Additionally, the first output model sides 360 and the second output model sides 370 may have a partial overlap 352. Additionally, the second output model sides 370 and the third output model sides 380 may have a partial overlap 353. The third output model sides 380 and the fourth output model sides 390 may have a partial overlap 354. The fourth output model sides 390 and the first output model sides 360 may have a partial overlap 351.

The image registration apparatus generates a sidewall image visualizing the surrounding environment by using the images mapped respectively to the output model sides 360, 370, 380, 390 disposed on the side walls 350 of the bowl model. The image registration apparatus generates a resultant screen image by combining the bottom image generated based on the bottom surface 300 of the bowl model with the sidewall image generated based on the side walls 350 of the bowl model.

Figure 4:
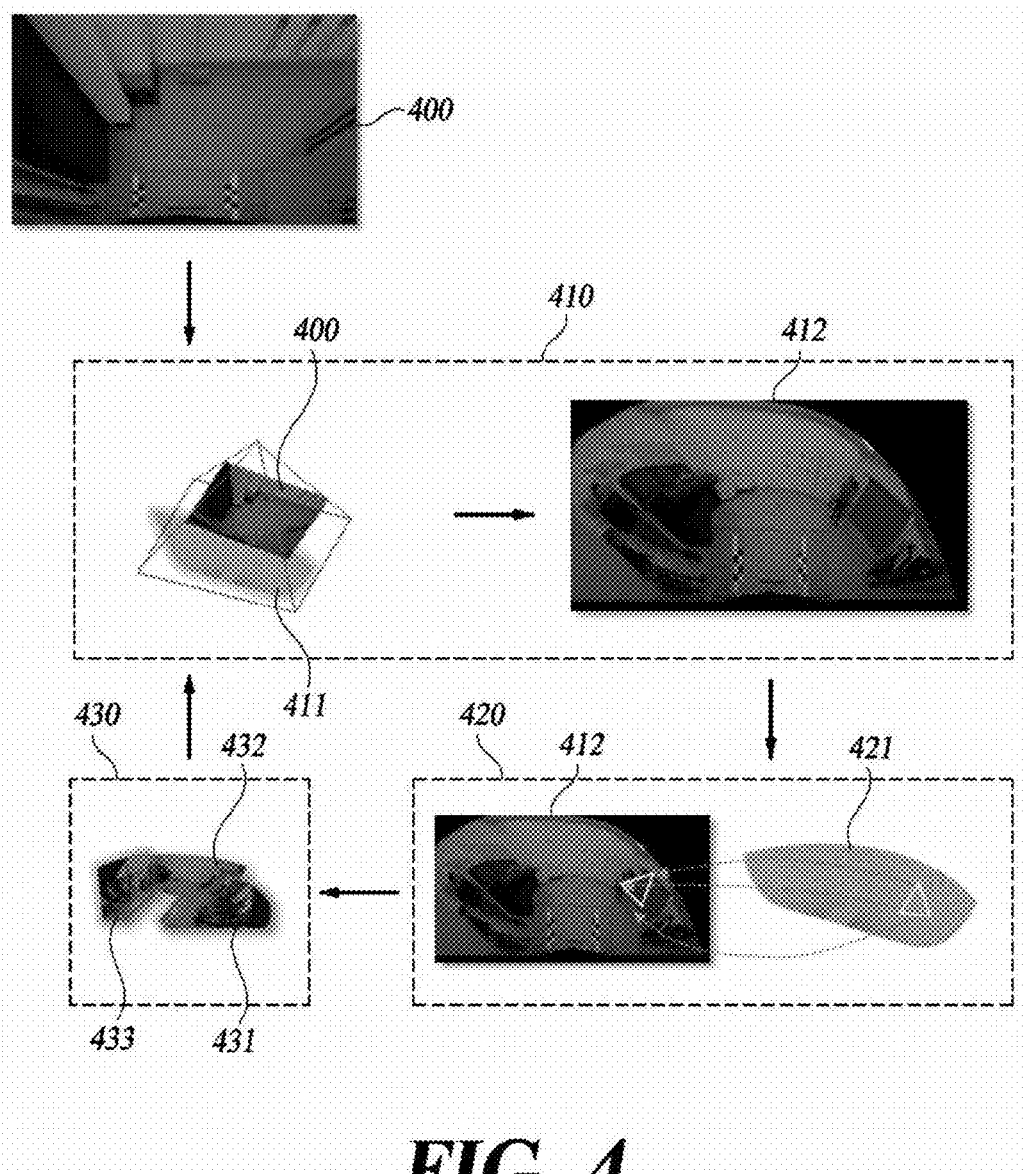
FIG. 4 is a diagram of a process performed by an image registration apparatus for mapping at least one image captured by at least one camera to an output model, according to at least one embodiment.

FIG. 4 is a diagram of a process including Steps 410, 420, and 430 performed by an image registration apparatus for mapping at least one image captured by at least one camera to an output model, according to at least one embodiment.

As shown in FIG. 4, the image registration apparatus generates an image 400 based on an image captured by a camera. The image registration apparatus processes the captured image from the camera with an operation such as lens correction, rotation, horizontal translation, or vertical translation to generate the image 400.

In Step 410, the image registration apparatus projects the image 400 onto a model 411 to generate an intermediate image 412. Here, the initial form of the model 411 may be the same as that of an output model 421. The model 411 may be transformed based on preset parameters.

In Step 420, the image registration apparatus maps the intermediate image 412 to the output model 421 to generate an output image. Here, the output model 421 may correspond to all or a part of a preset 3D model. The preset 3D model may have any one of a hemispherical shape and a bowl shape. The output image may be generated by the image registration apparatus texture mapping the intermediate image 412 to the output model 421.

In Step 430, the image registration apparatus places an output image 432, another output image 431, yet another output image 433, and yet another output image (not shown) in positions corresponding to the respective output models in the 3-D model. Here, the shape of the 3D model may be any one of a hemispherical shape and a bowl shape.

The image registration apparatus determines the match rate between the output image 432 and another output image 431. Here, the match rate may be at least one of the vertical match rate between the output image 432 and another output image 431, the curvature match rate between the output image 432 and another output image 431, and the proportion match rate between the output image 432 and another output image 431.

The image registration apparatus transforms the model 411 by adjusting parameters based on the result of comparing the match rate between the output image 432 and another output image 431 with a preset reference match rate. The image registration apparatus may project the image 400 on the transformed model to obtain a new intermediate image having new texture coordinates. The image registration apparatus generates a new output image by texture mapping the new intermediate image to the output model 421. Between the new output image and another output image 431, more improved registration is achieved over the model 411 before the transformation.

Figure 5A:
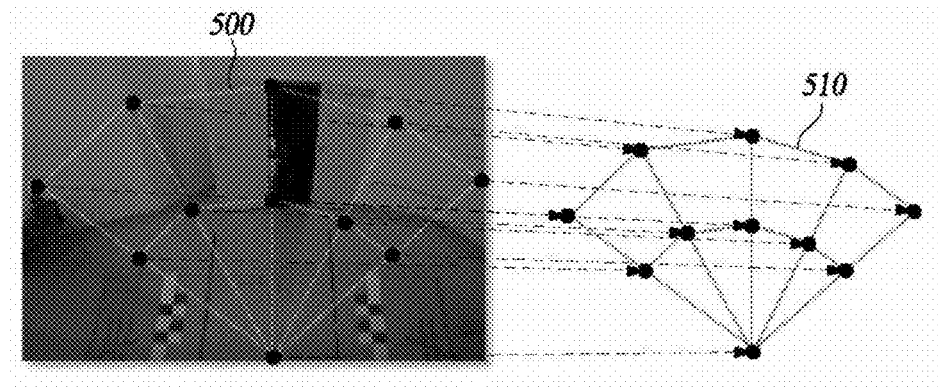
FIG. 5A and FIG. 5B are diagrams of a process performed by the image registration apparatus for using new texture coordinates generated by adjusting a first parameter as a basis for mapping an intermediate image to an output model, according to at least one embodiment.
Figure 5B:
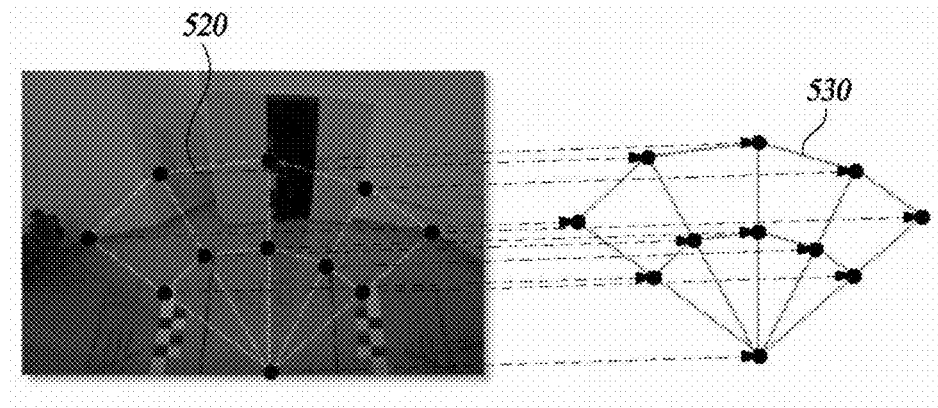

FIG. 5A and FIG. 5B are diagrams of a process performed by the image registration apparatus for using new texture coordinates generated by adjusting a first parameter as a basis for mapping an intermediate image to an output model, according to at least one embodiment.

FIG. 5A illustrates a process performed by the image registration apparatus for projecting an image onto a model 500 before transformation to generate an intermediate image and mapping the generated intermediate image to an output model 510. FIG. 5B illustrates a process performed by the image registration apparatus for projecting the image onto a model 520 transformed based on the first parameter to generate an intermediate image, and mapping the generated intermediate image to an output model 530.

As shown in FIG. 5A, the image registration apparatus projects the image onto the model 500 before transformation to generate the intermediate image. The image registration apparatus obtains texture coordinates of the intermediate image, respectively corresponding to the model coordinates representing the model 500, and maps the intermediate image to the output model 510 based on the obtained texture coordinates to generate an output image.

As shown in FIG. 5A and FIG. 5B, the image registration apparatus may adjust the vertical component values of the model coordinates based on the first parameter to transform the model 500 into the new model 520. Here, the new model 520 may have a changed sidewall slope value based on the vertical component values of the new model coordinates.

Referring back to FIG. 5B, the image registration apparatus projects the image onto the transformed model 520 to generate the intermediate image. The image registration apparatus obtains new texture coordinates respectively corresponding to the model coordinates representing the transformed model 520. The image registration apparatus maps the intermediate image to the output model 530 based on the obtained texture coordinates to generate a new output image.

The new texture coordinates generated by the image registration apparatus based on the transformed model 520 may be the same as the coordinates obtained by vertically moving the texture coordinates generated based on the model 500 before the transformation.

The new output image generated by the image registration apparatus mapping the intermediate image to the output model 530 based on the new texture coordinates is as good as vertically moving the output image generated by mapping the intermediate image to the output model 510 based on the texture coordinates of the model 500 before the transformation.

Figure 6A:
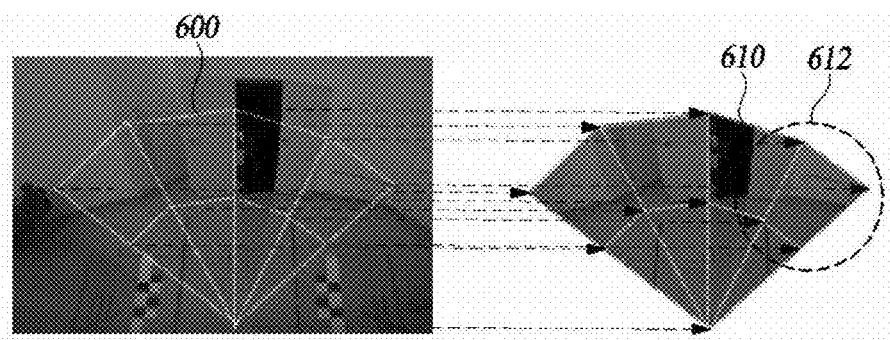
FIG. 6A and FIG. 6B are diagrams of a process performed by the image registration apparatus for using new texture coordinates generated by adjusting a second parameter as a basis for mapping an intermediate image to an output model, according to at least one embodiment.
Figure 6B:
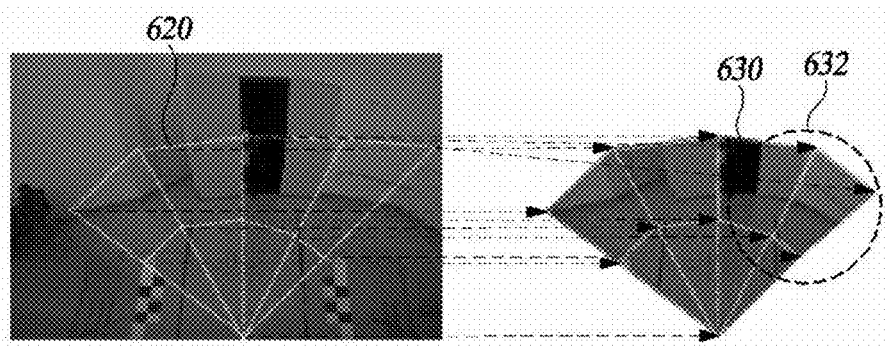

FIG. 6A and FIG. 6B are diagrams of a process performed by the image registration apparatus for using new texture coordinates generated by adjusting a second parameter as a basis for mapping an intermediate image to an output model, according to at least one embodiment.

FIG. 6A illustrates a process performed by the image registration apparatus for projecting an image onto a model 600 to generate an intermediate image and mapping the generated intermediate image to an output model 610. FIG. 6B illustrates a process performed by the image registration apparatus for projecting the image onto a new model 620 transformed based on the second parameter, and mapping the generated intermediate image to an output model 630.

As shown in FIG. 6A, the image registration apparatus projects the image onto the model 600 before transformation to generate an intermediate image. The image registration apparatus obtains texture coordinates of the intermediate image respectively corresponding to model coordinates representing the model 600, and maps the intermediate image to the output model 610 based on the obtained texture coordinates to generate an output image.

As shown in FIG. 6A and FIG. 6B, the image registration apparatus modifies the model 600 by adjusting the vertical component values of the model coordinates based on the second parameter to generate the new model 620. The shape of the left part or the right part of the model may be independently transformed according to the value of the second parameter. The new model 620 transformed based on the second parameter will be shaped based on the changed vertical component value for each model coordinate so that the left model part remains the same while the model wall surface has the curvature decreasing toward the right edge of the model. The model 620 transformed based on the parameters becomes a shape in which the curvature of the model sidewalls becomes smaller as the distance between the model coordinates forming the model sidewalls increase toward the right edge of the model.

The image registration apparatus generates a new intermediate image by projecting the image onto the new model 620. Here, the projection of the image on the new model 620 is set to be in the vertical direction of the new model 620. The image registration apparatus obtains texture coordinates of the new intermediate image, respectively corresponding to model coordinates representing the new model 620. Here, the new intermediate image projected on the new model 620 includes a texture of areas widening toward the right edge thereof.

Referring back to FIG. 6B, the image registration apparatus generates an intermediate image by projecting the image onto the new model 620. The image registration apparatus acquires texture coordinates respectively corresponding to model coordinates representing the new model 620. The image registration apparatus maps the intermediate image to the output model 630 based on the obtained texture coordinates to generate an output image.

With the texture of the intermediate image mapped to the output model 630, the closer toward the right edge of the output model, the further vertically shifted texture mapping occurs from the texture of the intermediate image before the model transformation. This renders the output image to have its curvature increasing toward the right edge of the output model, giving a visible effect that lines in output image 632 after the model transformation are more curved than lines in output image 612 before the model transformation.

Figure 7A:
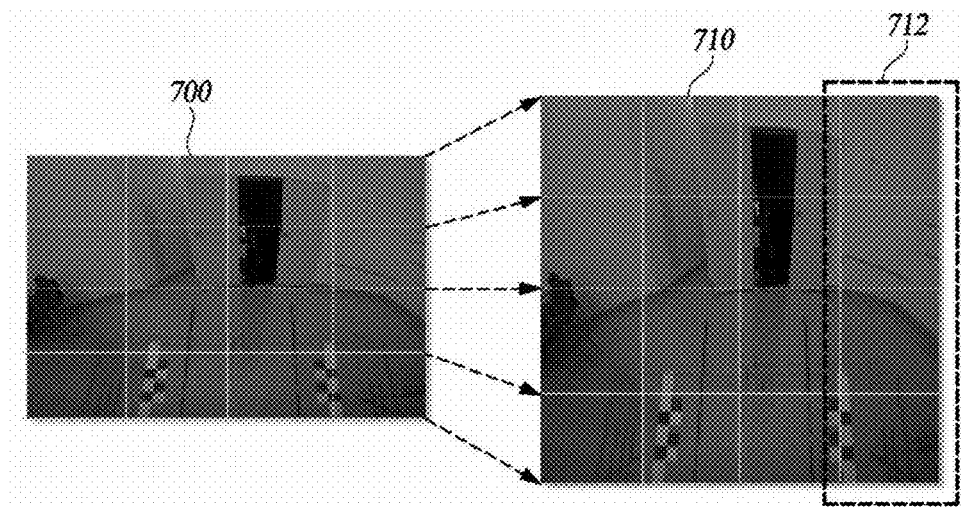
FIG. 7A and FIG. 7B are diagrams of a process performed by the image registration apparatus for using new texture coordinates generated by adjusting a third parameter as a basis for mapping an intermediate image to an output model, according to at least one embodiment.
Figure 7B:
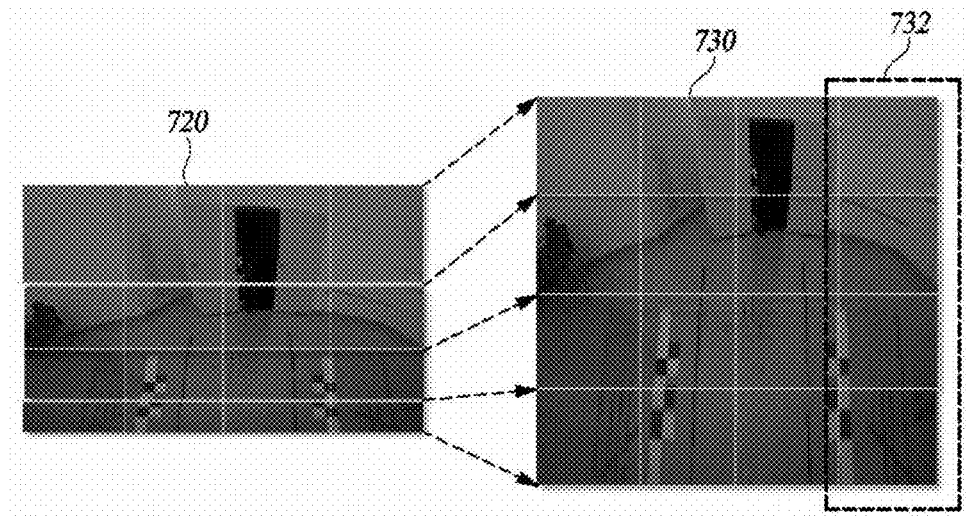

FIG. 7A and FIG. 7B are diagrams of a process performed by the image registration apparatus for using new texture coordinates generated by adjusting a third parameter as a basis for mapping an intermediate image to an output model, according to at least one embodiment.

FIG. 7A illustrates a process performed by the image registration apparatus for projecting an image onto a model 700 before transformation to generate an intermediate image and mapping the generated intermediate image to an output model 710. FIG. 7B shows a process performed by the image registration apparatus for projecting the image onto a new model 720 transformed based on the third parameter to generate an intermediate image, and mapping the generated intermediate image to an output model 730.

As shown in FIG. 7A, the image registration apparatus projects the image onto the model 700 before transformation to generate the intermediate image. The image registration apparatus obtains texture coordinates of the intermediate image, respectively corresponding to the model coordinates representing the model 700, and maps the intermediate image to the output model 710 based on the obtained texture coordinates to generate an output image.

As shown in FIG. 7A and FIG. 7B, the image registration apparatus may change the vertical component values of the model coordinates based on the third parameter to transform the model 700 into the new model 720. The new model 720 has its vertical length increased toward the top of the sidewalls of the model. The vertical length of the new model 720 increases at a constant rate as going upward on the side walls. Here, the constant rate at which the vertical length is increased may vary according to the value of the third parameter.

As shown in FIG. 7B, the image registration apparatus generates the intermediate image by projecting the image onto the new model 720. The image registration apparatus obtains the texture coordinates respectively corresponding to model coordinates representing the new model 720. The image registration apparatus maps the intermediate image to the output model 730 based on the obtained texture coordinates to generate the output image.

The output image on the new model 720 exhibits a vertical shift increasingly revealing toward the bottom thereof when compared to the output image mapped to the output model 710 based on the model 700 before the transformation. With the intermediate image mapped to the output model 730 based on the texture coordinates generated using the new model 720, the output model 730 presents the superior texture having vertically extended lower portions of a right vertical proportion over the lower portion of the new model 720, which had a gradually shortening vertical distance. Therefore, the closer toward the bottom of the intermediate image, the further vertically extended texture mapping occurs.

A new output image section 732 is one obtained by vertically shifting an output image section 712 before transformation by different lengths at different vertical positions. Here, the image vertically shifted by different lengths at different vertical positions is an image vertically shifted by lengths weighted at a constant rate according to the vertical position.

FIG. 8 a diagram of an image registration apparatus 800 according to another embodiment of the present disclosure.

As shown in FIG. 8, the image registration apparatus 800 includes a micro controller unit (MCU) 830, a deserializer 840, a video processing unit (VPU) 850, and a serializer 860.

The micro controller unit 830 controls the operation of the image registration apparatus 800. Upon receiving an external signal inputted, the micro controller unit 830 transmits a control signal to the video processing unit 850.

The external signal of the image registration apparatus 800 may be any one of a gear signal 813 and a switch signal 816. The gear signal 813 is information that the transmission of the vehicle has engaged a specific gear. The switch signal 816 is capable of controlling the operation of the image registration apparatus 800.

Upon receiving the gear signal 813 or the switch signal 816, the micro controller unit 830 transmits a control signal to perform image registration to the video processing unit 850.

The micro controller unit 830 transmits a control signal for terminating the image registration to the video processing unit 850 upon receiving the gear signal 813 including information that the vehicle has shifted from the reverse gear to a non-reverse gear or receiving the switch signal 816 to terminate the operation of the image registration apparatus 800.

The image registration apparatus 800 includes a deserializer 840 that receives the images captured by the cameras 822, 824, 826, and 828 and transmits them to the video processing unit 850.

A first camera 822, a second camera 824, a third camera 826, and a fourth camera 828 take images around the vehicle in different directions to generate and transmit a first image, a second image, a third image, and a fourth image to the deserializer 840. Here, the first image may be the front side image of the vehicle, the second image the rear side image, the third image the left side image, and the fourth image the right side image thereof.

The deserializer 840 synchronizes the first image, second image, third image, and fourth image inputted in parallel. The deserializer 840 serially transmits the synchronized first to fourth images to the video processing unit 850.

The video processing unit 850 performs image registration. Upon receiving a control signal for performing image registration from the micro controller unit 830, the video processing unit 850 performs the image registration based on the first through fourth images transmitted by the deserializer 840.

The video processing unit 850 projects the first image, second image, third image, and fourth image to the respective corresponding ones of a first model, second model, third model, and fourth model to generate a first intermediate image, second intermediate image, third intermediate image, and fourth intermediate image. Here, the first intermediate image, second intermediate image, third intermediate image, and fourth intermediate image include texture coordinates of their projected images, respectively. The first model, second model, third model, and fourth model may correspond to all or a part of a 3D model having any one of a hemispherical shape and a bowl shape.

The video processing unit 850 texture maps the first intermediate image, second intermediate image, third intermediate image, and fourth intermediate image to the respective corresponding ones of the first output model, second output model, third output model, and fourth output model to generate a first output image, second output image, third output image, and fourth output image. Here, the first output model, second output model, third output model, and fourth output model may correspond to all or a part of the 3D model.

The video processing unit 850 performs image registration by placing the first output image, second output image, third output image, and fourth output image over the 3-D model at the first output model, second output model, third output model, and third output image, respectively.

The video processing unit 850 determines the match rate of the output images based on the first output image, second output image, third output image, and fourth output image. Here, the match rate of the output images may be at least one of vertical match rate, curvature match rate, and proportion match rate. The match rate of the output images may be determined by comparing feature points between two adjacent images among the first output image, second output image, third output image, and fourth output image or by using a difference image between those two adjacent images.

The video processing unit 850 determines whether the match rate of two adjacent images among the first output image, the second output image, the third output image, and the fourth output image is less than the preset reference match rate and if yes, uses the preset parameter as a basis for transforming the model related to any one of the two adjacent images.

The video processing unit 850 projects the image onto the transformed model to generate an intermediate image having new texture coordinates, and texture maps the intermediate image to the output model based on the new texture coordinates to obtain a new output image. Here, the new output image is an output image that has its match rate with other adjacent output images adjusted to be equal to or greater than the preset reference match rate.

The video processing unit 850 transmits the registered output images to the serializer 860. The serializer 860 converts the registered output images into serial images and transmits them to a display 870 external to the image registration apparatus 800. The display 870 outputs the registered images around the vehicle.

Figure 9:
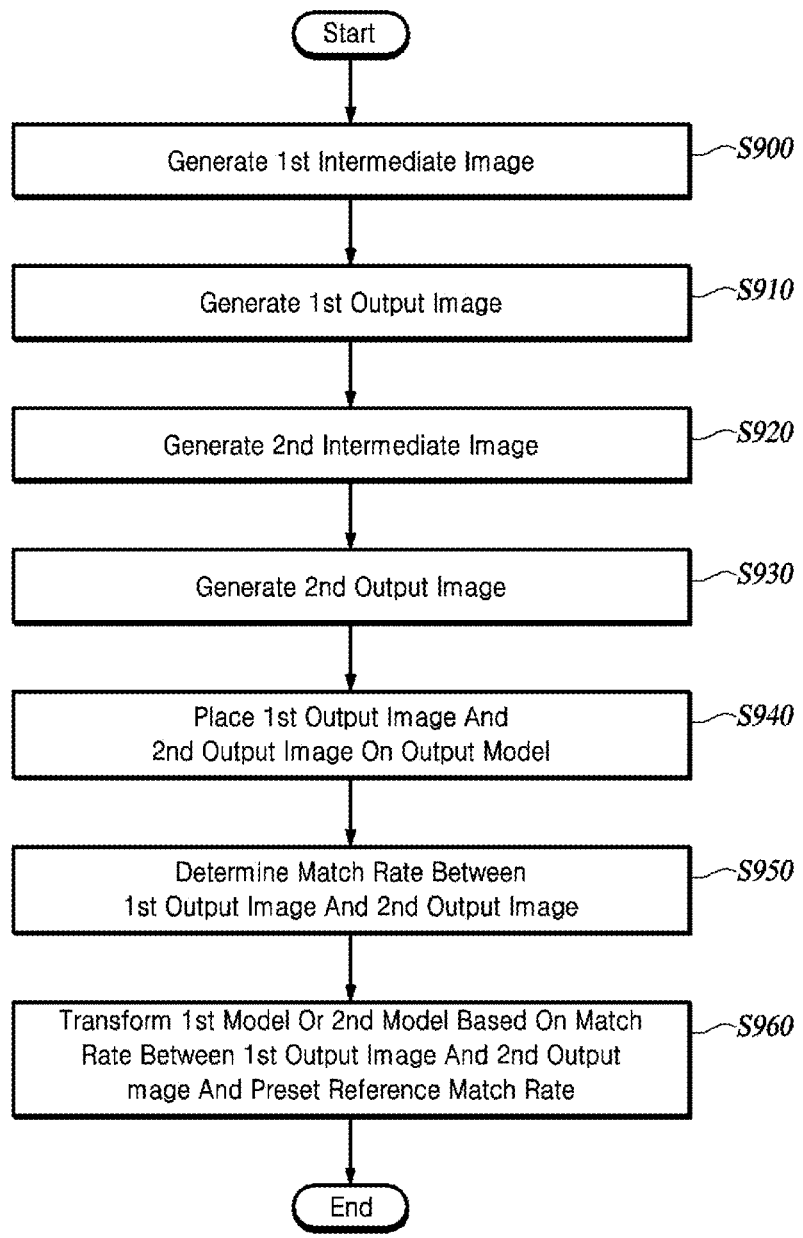
FIG. 9 is a flowchart of an image registration method according to at least one embodiment of the present disclosure.

FIG. 9 is a flowchart of an image registration method according to at least one embodiment of the present disclosure.

As shown in FIG. 9, the image registration apparatus projects, onto a first model, a first image generated based on the image captured by the first camera to generate a first intermediate image (S900). Here, the initial form of the first model may be the same as that of a first output model. The first model may be transformed based on preset parameters.

The image registration apparatus may project, onto the first model, images that correspond respectively to the frames constituting the first image to obtain the first intermediate image. The first intermediate image includes the first intermediate sub-images that are each obtained by the image registration apparatus projecting, onto the first model, the images that correspond respectively to the frames constituting the first image. The first intermediate image may be a composite image in which the respective frames constituting the first image are combined with their respective corresponding first intermediate sub-images in chronological order.

The image registration apparatus maps the first intermediate image to the first output model to generate a first output image (S910). Here, the first output model may correspond to all or a part of a preset 3D model. The preset 3D model may be any one of a hemispherical shape and a bowl shape. The first output image may be an image obtained by the image registration apparatus texture mapping the first intermediate image to the first output model.

The image registration apparatus projects, onto a second model, a second image generated based on the image captured by the second camera to generate a second intermediate image (S920). Here, the initial form of the second model may be the same as that of a second output model. The second model may be transformed based on preset parameters.

The image registration apparatus may project, onto the second model, images that respectively correspond to the frames constituting the second image to obtain the second intermediate image. The second intermediate image includes second intermediate sub-images that are each obtained by the image registration apparatus projecting, onto the second model, the images that respectively correspond to the frames constituting the second image. The second intermediate image may be a composite image in which the respective frames constituting the second image are combined with their respective corresponding second intermediate sub-images in chronological order.

The image registration apparatus maps the second intermediate image to the second output model to generates a second output image (S930). Here, the second output model may correspond to all or a part of the preset 3D model. Additionally, the preset 3D model may have any one of a hemispherical shape and a bowl shape. Additionally, the second output image may be an image obtained by the image registration apparatus texture mapping the second intermediate image to the second output model.

The image registration apparatus places the first output image on the 3D model at a position corresponding to the first output model and places the second output image on the 3D model at a position corresponding to the second output model (S940). Here, the shape of the 3D model may be any one of a hemispherical shape and a bowl shape. The image registration apparatus may arrange the first output model and the second output model so that they have side edges in contact with each other forming a boundary line. Additionally, the image registration apparatus may arrange the first output model and the second output model so that some regions of the first output model and some regions of the second output model overlap each other.

The image registration apparatus determines a match rate between the first and second output videos or images (S950). The image registration apparatus determines, based on a preset period, the match rate between two frames belonging to the first output video and the second output video and corresponding to the preset period. Here, the preset period may be but is not limited to, ⅟30 second. The match rate between the first and second output images may be at least one of a vertical match rate, curvature match rate, and proportion match rate.

The image registration apparatus obtains a first screen image that is the first output image as outputted on a display and obtains a first comparison image that is a two-dimensional image from the first screen image. The first comparison image may be a frame image corresponding to a preset time point. The image registration apparatus obtains a second screen image that is the second output image as outputted on the display and obtains a second comparison image that is a two-dimensional image from the second screen image. The second comparison image may be a frame image corresponding to a preset time point. Here, the preset time point may be any one of a time point for determining the vertical match rate between the first and second output images, a time point for determining the curvature match rate, and a time point for determining the proportion match rate therebetween.

The image registration apparatus determines the match rate between the first and second output images by using the feature point comparison or difference image. The method of determining the match rate between the first and second output images through feature point comparison and the method of determining their match rate based on the difference image may be equivalent to the description presented by referring to FIG. 1 and need no further elaboration.

The image registration apparatus transforms at least one of the first model and the second model based on the match rate between the first and second output images and a preset reference match rate (S960).

When the match rate between the first and second output images is equal to or greater than a preset reference match rate, the image registration apparatus generates a resultant screen image based on the first output image and the second output image.

When the image match rate between the first and second output images is less than a preset reference match rate, the image registration apparatus adjusts a preset parameter to adjust the vertical component values of the model coordinates of any one of the first model and the second model to transform at least one of the first model and the second model.

The image registration apparatus may set a direction as a model's vertical direction in which any one of the first image and the second image is projected onto any one of the first model and the second model. Here, the model's vertical direction may be the Z-axis direction of the Cartesian coordinate system in which any one of the first model and the second model is expressed.

The image registration apparatus changes vertical component values of the model coordinates representing any one of the first model and the second model by using a preset parameter. When the vertical direction of any one of the first model and the second model is set as the Z-axis of the Cartesian coordinate system in which any one of the first model and the second model is expressed, the Z component values are changed in the model coordinates representing any one of the first model and the second model.

The image registration apparatus performs the model transformation so that the slope of the side walls constituting any one of the first model and the second model has a new slope by adjusting the first parameter. The image registration apparatus adjusts the second parameter to perform the model transformation so that the curvature of the side walls constituting any one of the first model and the second model has a new curvature. The image registration apparatus adjusts the third parameter to performs the model transformation so that the models' vertical length increases or decreases at different ratios according to the height of the side walls constituting any one of the first model and the second model.

Here, the initial form of the first model may be the same as the first output model, and the initial form of the second model may be the same as the second output model. Additionally, the initial form of any one of the first model and the second model may be a hemispherical shape, a bowl shape, a part of a hemispherical shape, or a part of a bowl shape.

When the first model is transformed, the image registration apparatus projects the first image on the transformed first model to generate a new first intermediate image. The first intermediate image has new texture coordinates corresponding to the model coordinates of the transformed first model. The image registration apparatus texture maps the first intermediate image to the first output mode to obtain a new first output image.

When the second model is transformed, the image registration apparatus projects the second image on the transformed second model to generate a new second intermediate image. The second intermediate image has new texture coordinates corresponding to the model coordinates of the modified second model. The image registration apparatus texture maps the second intermediate image to the second output model to obtain a new second output image.

The image registration apparatus may transform at least one of the first model and the second model so that the match rate between the first and second output images is equal to or greater than a preset reference match rate. Here, the match rate between the first and second output images may be at least one of a vertical match rate, curvature match rate, and proportion match rate.

Figure 10:
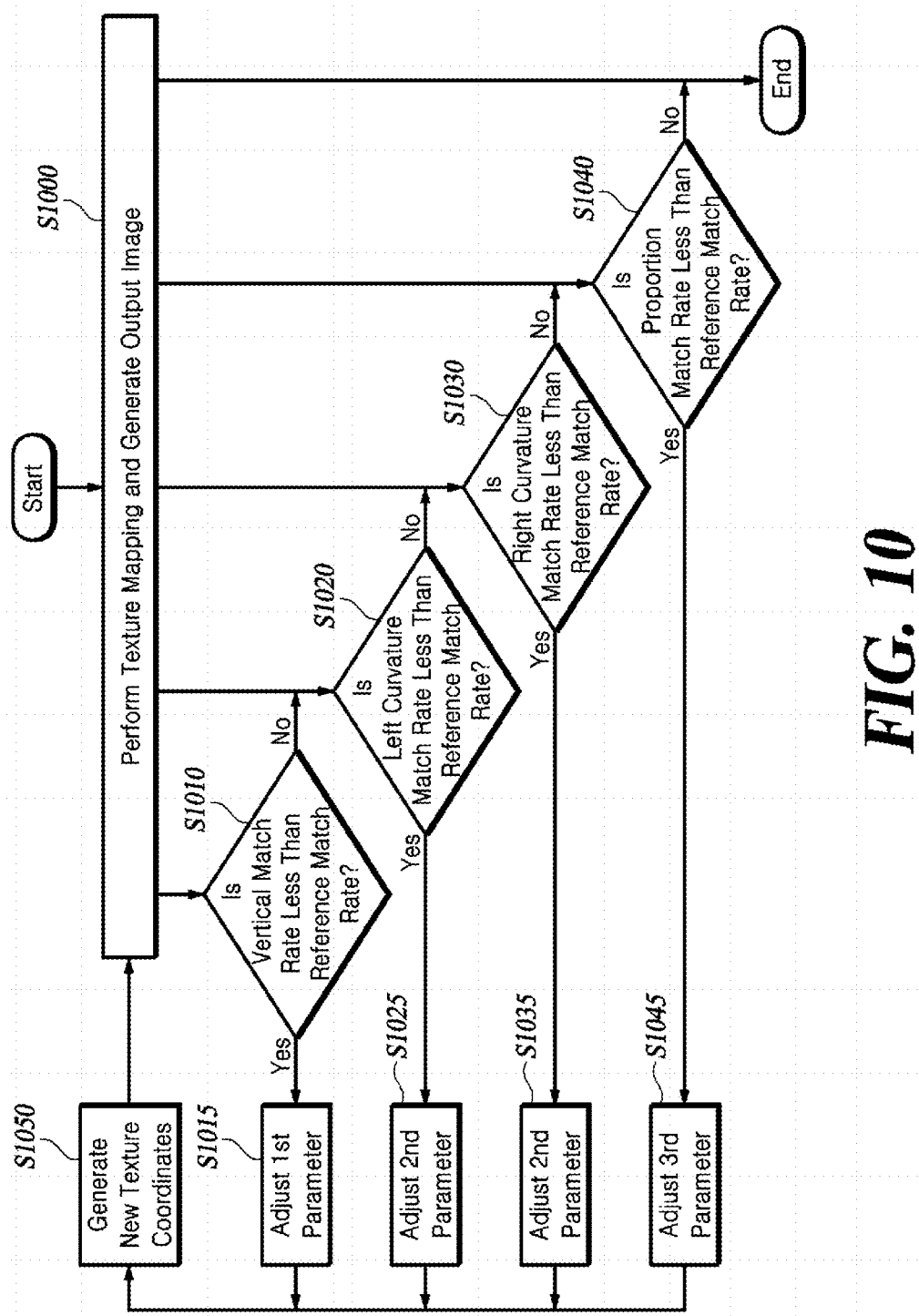
FIG. 10 is a flowchart of an image registration method according to another embodiment of the present disclosure.

FIG. 10 is a flowchart of an image registration method according to another embodiment of the present disclosure.

As shown in FIG. 10, the image registration apparatus performs a texture mapping and generates an output image based on the texture coordinates of an input image (S1000). The texture coordinates of the input image are the texture coordinates of an intermediate image obtained by projecting the input image onto a 3-D model. The image registration apparatus texture maps the intermediate image to the output model based on the texture coordinates to generate the output image.

The image registration apparatus determines the match rate between two adjacent output images and compares the determined match rate with a preset reference match rate (S1010, S1020, S1030, S1030). Here, the determination of match rate may be at least one of determination of a vertical match rate, determination of a left curvature match rate, determination of a right curvature match rate, and determination of a proportion match rate. The preset reference match rate may be at least one of a reference vertical match rate, a reference curvature match rate, and a reference proportion match rate.

The image registration apparatus obtains, from screen images, 2-D images of two adjacent output images. Here, the 2-D images may be frame images at a preset time point among the screen images. The preset time may be at least one of a time point for determining a vertical match rate between two adjacent output images, a time point for determining a curvature match rate, and a time point for determining a proportion match rate therebetween.

The image registration apparatus determines the vertical match rate between two adjacent output images based on the 2-D images of the first output image and the second output image and compares the determined vertical match rate with the reference vertical match rate (S1010). When the vertical match rate is less than the reference vertical match rate, the image registration apparatus adjusts a first parameter (S1015) to transform the first model or the second model and generate new texture coordinates (S1050). Here, the first parameter is for adjusting the vertical match rate of the output images.

The image registration apparatus generates new output images mapped based on the new texture coordinates (S1000). The image registration apparatus obtains, from the screen images, the new output images and the 2-D images of the two adjacent output images.

The image registration apparatus determines the left curvature match rate between the two adjacent output images based on the new output images and the 2-D images of the two adjacent output images and compares the determined left curvature match rate with a reference curvature match rate (S1020). When the curvature match rate between a left part of one of the two adjacent output images and a right part of the other adjacent output image is less than the preset reference curvature match rate, the image registration apparatus adjusts a second parameter (S1025) to transform the left part of one of the two adjacent output images and generate new texture coordinates (S1050). Here, the second parameter is for adjusting the curvature match rate of the output images.

The image registration apparatus generates output images mapped based on the new texture coordinates (S1000). The image registration apparatus obtains, from the screen images, the output images and 2-D images of the adjacent output images.

The image registration apparatus determines a right curvature match rate between the two adjacent output images based on the 2-D images of the output images and the adjacent output images and compares the determined right curvature match rate with the reference curvature match rate (S1030). When the curvature match rate between the right part of one of the two adjacent output images and the left part of the other adjacent output image is less than the preset reference curvature match rate, the image registration apparatus adjusts a right second parameter (S1035) to transform the right part of any one of the output image models and generate new texture coordinates (S1050). Here, the right second parameter is for adjusting the right curvature match rate of the output images.

The image registration apparatus generates new output images mapped based on the new texture coordinates (S1000). The image registration apparatus obtains, from the screen images, the new output images and 2-D images of the adjacent output images.

The image registration apparatus determines the proportion match rate between two adjacent output images based on the new output images and the 2-D images of the adjacent output images and compares the determined proportion match rate with the reference proportion match rate (S1040). When the proportion match rate is less than the preset reference proportion match rate, the image registration apparatus adjusts the third parameter (S1045) to transform the first model or the second model and generates new texture coordinates (S1050). Here, the third parameter is for adjusting the proportion match rate of the models.

The image registration apparatus generates output images mapped based on the new texture coordinates (S1000). The image registration apparatus obtains, from the screen images, the output images and 2-D images of the adjacent output images.

The image registration apparatus may be responsive to when a preset reference match rate is equaled or exceeded by any one of the vertical match rate between two adjacent ones of the output images, the left curvature match rate, the right curvature match rate, and the proportion match rate therebetween for determining the other one of these match rates and comparing the determined other match rates with the reference match rate. The image registration apparatus generates the output image by texture mapping the intermediate image to the output model based on the current texture coordinates when the preset reference match rates are equaled or exceeded by the vertical match rate, the left curvature match rate, the right curvature match rate, and the proportion match rate, or when it is time to terminate the operation of the image registration apparatus.

According to at least one embodiment, it has been described that Steps S1010 to S1040 are each performed once, although other embodiments repeatedly perform Steps S1010 to S1040, and perform the respective ones of Steps S1010 to S1040 independently, repeatedly, and in parallel.

Although FIGS. 9 and 10 present the respective steps thereof as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of steps illustrated by FIGS. 9 and 10 or by performing one or more of the steps thereof in parallel, and hence the steps in FIGS. 9 and 10 are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

According to some embodiments of the present disclosure, the apparatus and method for image registration can remove mismatch that occurs in a 3D image obtained by a plurality of images combined.

According to some embodiments of the present disclosure, the apparatus and method for image registration can reduce a perceived discord in a 3D image of combined images by improving the vertical registration thereamong and improve the discernability of the image.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An image registration apparatus, comprising at least one processor configured to:
    project a first image to a first model to generate a first intermediate image;
    map the first intermediate image to a first output model to generate a first output image;
    project a second image to a second model to generate a second intermediate image;
    map the second intermediate image to a second output model to generate a second output image;
    place the first output image and the second output image into a preset three-dimensional (3-D) model; and
    determine a match rate between the first output image and the second output image based on the placement of the first output image and the second output image into the preset 3-D model, and transform shapes of at least one of the first model and the second model based on a determined match rate and a preset reference match rate.

2. The image registration apparatus of claim 1, the at least one processor further configured to:
    determine a vertical match rate between the first output image and the second output image,
    determine a curvature match rate between the first output image and the second output image, and
    determine a proportion match rate between the first output image and the second output image.

3. The image registration apparatus of claim 2, the at least one processor further configured to:
    compare the first output image and the second output image to determine a vertical match rate between the first output image and the second output image in terms of vertical directionality, and
    determine whether the determined vertical match rate is less than a preset reference vertical match rate, and modify at least one of the first model and the second model by adjusting a first parameter if the determined vertical match rate is less than the preset reference vertical match rate.

4. The image registration apparatus of claim 3, wherein the first model constitutes part of the preset three-dimensional (3-D) model and the second model constitutes part of the preset 3-D model, and
    the first parameter adjusts at least one of slopes of sidewalls that form the preset 3D model constituted by the first model and slopes of sidewalls that form the preset 3D model constituted by the second model.

5. The image registration apparatus of claim 2, the at least one processor further configured to:
    compare between the first output image and the second output image to determine a curvature match rate between the first output image and the second output image in terms of curvature, and
    determine whether the determined curvature match rate is less than a preset reference curvature match rate, and modify at least one of the first model and the second model by adjusting a second parameter if the determined curvature match rate is less than the preset reference curvature match rate.

6. The image registration apparatus of claim 5, wherein the first model constitutes part of the preset 3-D model and the second model constitutes part of the preset 3-D model, and
    the second parameter adjusts at least one of curvatures of sidewalls that form the preset 3D model constituted by the first model and curvatures of sidewalls that form the preset 3D model constituted by the second model.

7. The image registration apparatus of claim 2, the at least one processor further configured to:
    compare between the first output image and the second output image to determine a proportion match rate between the first output image and the second output image in terms of vertical dimension in a horizontal to vertical ratio, and
    determine whether the determined proportion match rate is less than a preset reference proportion match rate, and modify at least one of the first model and the second model by adjusting a third parameter if the determined proportion match rate is less than the preset reference proportion match rate.

8. The image registration apparatus of claim 7, wherein the first model constitutes part of the preset 3-D model and the second model constitutes part of the preset 3-D model, and
    the third parameter adjusts at least one of vertical dimensions in an aspect ratio of sidewalls that form the preset 3D model constituted by the first model and vertical dimensions in an aspect ratio of sidewalls that form the preset 3D model constituted by the second model.

9. An image registration method, comprising:
    projecting a first image to a first model to generate a first intermediate image;
    mapping the first intermediate image to a first output model to generate a first output image;
    projecting a second image to a second model to generate a second intermediate image;
    mapping the second intermediate image to a second output model to generate a second output image;
    place the first output image and the second output image into a preset three-dimensional (3-D) model; and
    determining a match rate between the first output image and the second output image based on the placement of the first output image and the second output image into the preset 3-D model, and transforming shapes of at least one of the first model and the second model based on a determined match rate and a preset reference match rate.

10. The image registration method of claim 9, wherein determining the match rate between the first output image and the second output image and transforming at least one of the first model and the second model based on the determined match rate and the preset reference match rate comprises:
- determining a vertical match rate between the first output image and the second output image;
- determining a curvature match rate between the first output image and the second output image; and
- determining a proportion match rate between the first output image and the second output image.

11. The image registration method of claim 10, wherein the determining of the vertical match rate between the first output image and the second output image comprises:
- comparing the first output image and the second output image to determine the vertical match rate between the first output image and the second output image in terms of vertical directionality; and
- determining whether the determined vertical match rate is less than a preset reference vertical match rate, and modifying at least one of the first model and the second model by adjusting a first parameter if the determined vertical match rate is less than the preset reference vertical match rate.

12. The image registration method of claim 11, wherein the first model constitutes part of the preset three-dimensional (3-D) model and the second model constitutes part of the preset 3-D model, and
- the first parameter adjusts at least one of slopes of sidewalls that form the preset 3D model constituted by the first model and slopes of sidewalls that form the preset 3D model constituted by the second model.

13. The image registration method of claim 10, wherein the determining of the curvature match rate between the first output image and the second output image comprises:
- comparing the first output image and the second output image to determine the curvature match rate between the first output image and the second output image in terms of curvature; and
- determining whether the determined curvature match rate determined is less than a preset reference curvature match rate, and modifying at least one of the first model and the second model by adjusting a second parameter if the determined curvature match rate is less than the preset reference curvature match rate.

14. The image registration method of claim 13, wherein the first model constitutes part of the preset 3-D model and the second model constitutes part of the preset 3-D model, and
- the second parameter adjusts at least one of curvatures of sidewalls that form the preset 3D model constituted by the first model and curvatures of sidewalls that form the preset 3D model constituted by the second model.

15. The image registration method of claim 10, wherein the determining of the proportion match rate between the first output image and the second output image comprises:
- comparing the first output image and the second output image based on a feature point or a difference image to determine a proportion match rate between the first output image and the second output image in terms of vertical dimension in a horizontal to vertical ratio; and
- determining whether the determined proportion match rate is less than a preset reference proportion match rate, and modifying at least one of the first model and the second model by adjusting a third parameter if the determined proportion match rate is less than the preset reference proportion match rate.

16. The image registration method of claim 15, wherein the first model constitutes part of the preset 3-D model and the second model constitutes part of the preset 3-D model, and
- the third parameter adjusts at least one of vertical dimensions in an aspect ratio of sidewalls that form the preset 3D model constituted by the first model and vertical dimensions in an aspect ratio of sidewalls that form the preset 3D model constituted by the second model.

* * * * *